United States Patent [19]

Gebien

[11] 3,800,777

[45] Apr. 2, 1974

[54] SELF-CLEANING GRILL FOR PORTABLE CHARCOAL COOKING UNIT

[75] Inventor: Willard Gebien, Mundelein, Ill.

[73] Assignee: Bel-Air Tool Die & Engineering Co., Chicago, Ill.

[22] Filed: Apr. 5, 1972

[21] Appl. No.: 241,200

[52] U.S. Cl................ 126/25 R, 99/385, 219/260
[51] Int. Cl............................................. F24b 3/00
[58] Field of Search ............ 99/378, 340, 385, 390, 99/423, 444, 445, 446, 450; 219/260-261, 395, 455; 110/1 F; 126/25, 39 E, 39 M; 93/DIG. 1

[56] References Cited
UNITED STATES PATENTS

| 3,293,099 | 12/1966 | Stark | 93/DIG. 1 |
| 2,024,386 | 12/1935 | Phelps | 99/340 UX |
| 3,252,407 | 5/1966 | Buerki | 99/446 |
| 3,273,556 | 9/1966 | Mogensen | 99/450 X |
| 3,392,664 | 7/1968 | Rosa | 99/446 X |
| 3,555,994 | 1/1971 | Nemetz | 99/444 |
| 3,555,995 | 1/1971 | Berger | 99/450 X |

Primary Examiner—Billy J. Wilhite
Assistant Examiner—Arthur O. Henderson
Attorney, Agent, or Firm—Edward L. Benno

[57] ABSTRACT

A formed wire grill for a portable cooking unit or outdoor barbeque which is self cleaning with the application of electric power to the grill terminals.

10 Claims, 4 Drawing Figures

PATENTED APR 2 1974   3,800,777

SELF-CLEANING GRILL FOR PORTABLE CHARCOAL COOKING UNIT

BACKGROUND OF THE INVENTION

Open wire grills of various configurations are used with a pan or bowl containing charcoal for the outdoor cooking or grilling of food. Because of the direct application or support of the food such as meat on such grills, they commonly become encrusted with partially burned food residues. Cleaning of such food-encrusted grills is generally a difficult and time consuming task.

The primary object of the present invention is to provide an electrically energized self-cleaning open wire grill for a portable charcoal cooking unit which is simple and convenient to use.

Various types of electrically energized heating means have been used with outdoor barbeque grills but such heating means are not suitable or convenient for the cleaning of the wire grills. Such heating means are primarily used as fire starters for igniting the charcoal to be used in cooking the food.

SUMMARY OF THE INVENTION

The grill of the present invention comprises a formed wire food supporting surface having a serpentine configuration. The formed wire is secured to a ring, which is electrically insulated from the formed wire. The ring further includes handle means and a support assembly for supporting the grill over a charcoal pan or bowl. The support assembly may take different forms depending upon the particular type of cooking unit with which it is to be used. Importantly the support assembly must prevent electrical contact between the formed wire food supporting assembly and the charcoal bowl or any cover therefor.

The formed wire food supporting assembly has an electrical terminal at each end thereof and is formed from a metal such as steel. The metal is selected to have sufficient electrical resistance so that with the application of electrical power to the terminals the formed wire will resistance heat to a temperature which causes any food residue on the grill to be burned to ashes which may easily be dusted from the grill. In one reduction to practice of the invention an application of 110 volt alternating current for 20 seconds was found to be sufficient to completely convert food residues on the grill to ashes. The current drain during the application of power was less than 15 amperes.

It is a further object of the present invention to provide an open formed wire food supporting grill in a portable outdoor charcoal cooking unit or the like in which the formed wire grill may be easily and conveniently cleaned by the application of power from a normal household source of electric power for a relatively short period of time.

Other objects and features of the invention will be apparent upon a perusal of the hereinafter following specification and the drawing.

DETAILED DESCRIPTION OF THE PREFERRED EMBODIMENT

Figure 3:
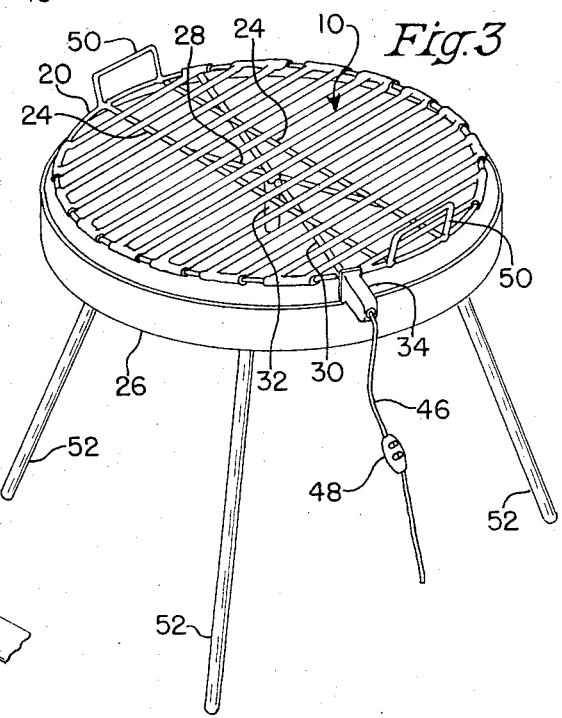
FIG. 3 is a perspective view of a portable charcoal grill including the present invention.

Although the embodiment of the invention shown in the drawing is circular for use in a circular charcoal cooking unit as shown in FIG. 3, the invention contemplates other shapes of cooking units such for example as rectangular.

Figure 1:
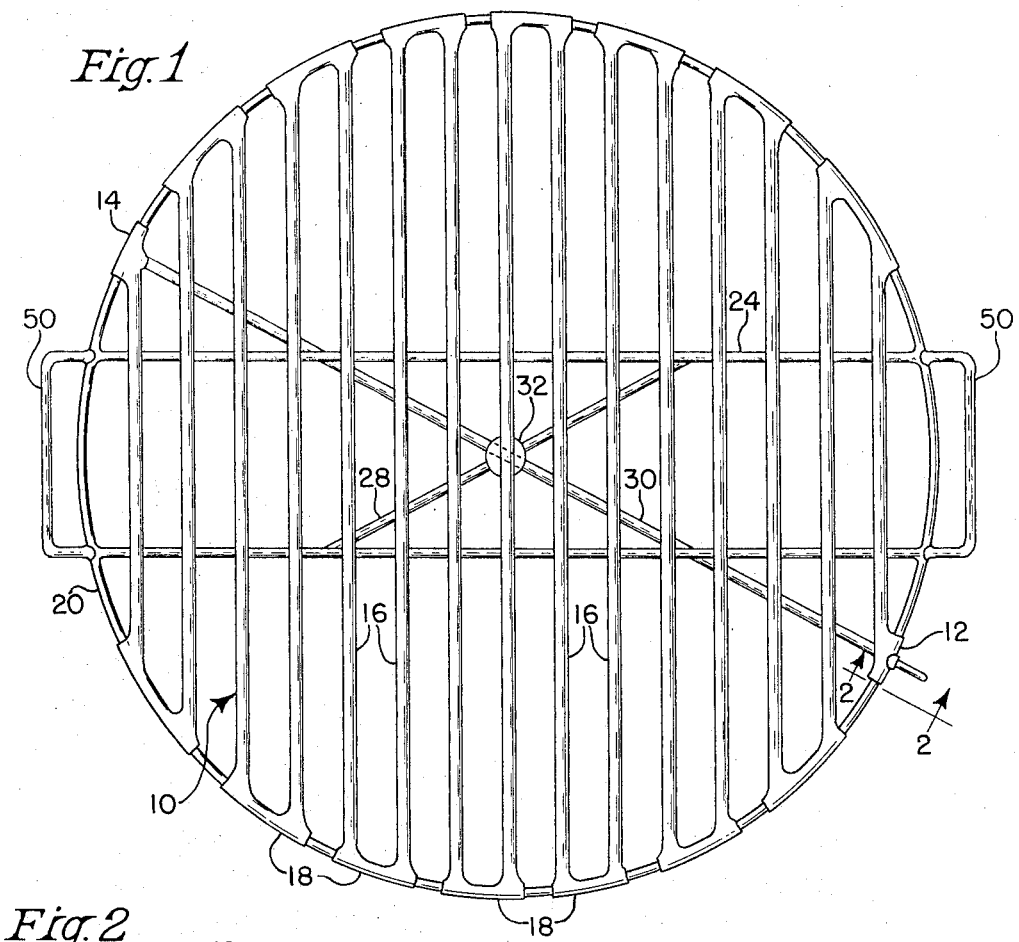
FIG. 1 is a top plan view of one embodiment of the invention.

As shown in FIG. 1, a material such as steel is formed into a serpentine assembly 10. The ends of the assembly 10 are shown at 12 and 14. A preferred form of the assembly 10 is made by stamping or punching from a sheet of a suitable steel. In the stamping operation the assembly 10 is formed as a parallel spaced apart series of formed wire food supporting sections 16 interconnected in a serpentine configuration by end sections 18. The invention further contemplates that the ends 12 and 14 may be interconnected and that one of the sections 18 may be opened and formed as terminals for the application of power.

The sections 16 have an inverted U or V shape in cross section. Such a cross sectional shape renders the sections 16 sufficiently thin to maintain a suitably high total electrical resistance, narrow enough to expose the food thereon to the charcoal, and yet sufficiently strong to properly support the food to be cooked thereon.

The end sections 18 are substantially C-shaped in cross section to provide for firm clamping of the assembly 10 on the ring 20. The end section 12 shown in FIG. 2 displays the shape of the end sections 18 and the manner in which the end sections 12, 14 and 18 are clamped to the ring 20. In the integral formation of the sections 16 and 18, any substantial decrease in cross sectional area going from the sections 16 to end sections 18 must be avoided to prevent excessively high currents from flowing across a reduced junction and potentially causing failure of the assembly 10.

The end sections 18 are greater in cross sectional area than the sections 16 and are consequently heated to a lower temperature than the sections 16 when electrical power is applied to the assembly 10. The larger areas of the end sections 18 are provided for the purpose of covering substantial arcuate portions of the ring 20 to thereby further provide for substantial cleaning of the ring 20 when power is applied to the assembly 10.

The metal of the assembly 10 is selected as one which in the above described configuration will cause any food residues on the assembly 10 to be reduced to ashes when a household source of electric power such as a 15 ampere, 110 VAC line is applied to the ends 12 and 14 of the assembly 10 for a period of less than a minute.

The ring 20 may be formed of any suitable metal such as steel but must be electrically insulated from the assembly 10. The ring 20 may be porcelain coated as at 22 in FIG. 2 and/or may be mica wrapped beneath the end sections 12, 14 and 18.

The ring 20 is further provided with a pair of cross braces 24 which extend between opposite sides of the ring 20 in the plane thereof and perpendicular to sections 16 of the assembly 10. The braces 24 are also electrically insulated from the sections 16 in the manner of the ring 20 and serve to further support the sections 16 and to provide a means for attachment of the grill supporting assembly in a bowl such as bowl 26 in FIG. 3.

The grill supporting assembly comprises a member 28, a member 30 and a pin 32. The members 28 and 30 intersect at the center of the ring 20 and are secured below and to the braces 24. The pin 32 is secured to the members 28 and 30 at the intersection thereof and depends therefrom. The pin 32 is carried in a suitable sleeve in the bowl 26 to support the grill above the bowl 26 and any charcoal therein.

Additional edge supports formed on the bowl 26 (not shown) may be provided to prevent any electrical contact of the assembly 10 to the bowl 26. In other types of charcoal cooking units the pin 32 may be omitted and primary support for the grill may be provided by edge supports in the cooking unit.

Figure 2:
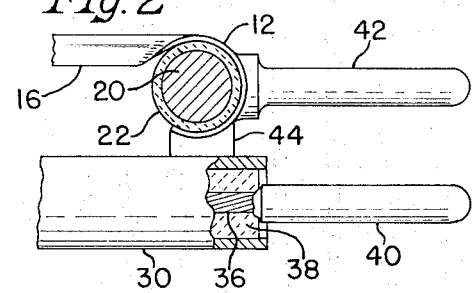
FIG. 2 is an enlarged cross sectional view of a portion of the structure shown in FIG. 1 and taken substantially along the line 2—2 of FIG. 1.
Figure 4:
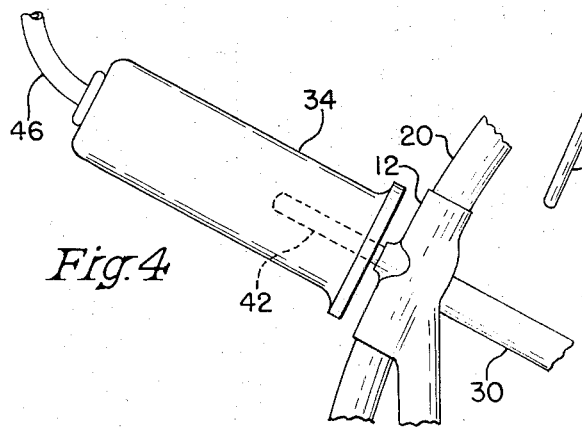
FIG. 4 is an enlarged top plan view of the power connection to the wire grill shown in FIG. 3.

In the present embodiment the member 30 further provides a return line for the end section 14 to the end section 12 for convenient attachment of an electrical power plug such as shown at 34 in FIGS. 3 and 4. For this purpose the member 30 in the present embodiment comprises a tube through which a conductor such as shown at 36 in FIG. 2 is carried. The conductor 36 is electrically insulated from the tube by any suitable means such as a ceramic material 38. The tube is obviously electrically insulated from the assembly 10. One end of the conductor 36 is electrically connected to end section 14 of the assembly 10 and the other end of conductor 36 is connected to pin terminal 40.

As shown in FIG. 2, the end section 12 of assembly 10 is provided with a pin terminal 42. From the foregoing it may be seen that the assembly 10 is cleaned by applying power across pin terminals 40 and 42. The two pin terminals 40 and 42 may be properly positioned relative to each other by an insulator block 44.

The invention contemplates that other arrangements may be used for bringing the ends of the assembly 10 to a common position for attachment of power. For example, an insulated conductor may be carried concentrically of the ring 20 from the end section 14 to end section 12.

The plug 34 may be of any suitable type known in the art capable of being projected onto the pin terminals 40 and 42. As shown in FIG. 3 a power cable 46 including a switch 48 is connected to the plug 34 for applying power to the assembly 10. The switch 48 may include an automatic timer which will apply power to the assembly 10 for a predetermined period of time.

Handles 50 at diametrically opposed portions of the ring 20 provide for convenient carrying of the grill assembly.

Legs 52 secured to the bowl 26 support the bowl 26 at a convenient cooking height.

From the foregoing it may be seen that the subject invention is a simple and convenient electrically energized self-cleaning grill for a portable cooking unit. The application of power to clean food residues from the grill may also be used to sanitize the grill immediately prior to use.

It is to be understood that changes can be made in aforedescribed invention by one skilled in the art within the spirit and scope of the hereinafter following claims.

I claim:

1. A self-cleaning food supporting grill for a portable cooking unit, said grill comprising a plurality of electrically and thermally uninsulated metal food supporting sections positioned in a spaced apart relationship to each other, a plurality of metal end sections connected to the ends of said food supporting sections to form an electrical series arrangement of said food supporting sections and said end sections, said series arrangement having a predetermined electrical resistance to burn any food residues from said series arrangement on the application of power thereto, a peripheral member, means securing said end sections to said peripheral member with said food supporting sections extending between opposite sides of said peripheral member to support said end sections and said food support sections solely on said peripheral member, support means on said peripheral member for supporting said peripheral member as a manually removeable unit in and electrically insulated from a portable cooking unit, electrical insulating means for electrically insulating said end sections from said peripheral member, and electrical terminal means fixedly mounted on said peripheral member to extend therefrom and electrically connected to the ends of said series arrangement for connecting a source of power to said series arrangement to resistance heat said series arrangement to burn any food residues from said grill.

2. A grill as defined in claim 1, wherein said food supporting sections are formed to have depending longitudinal sides.

3. A grill as defined in claim 2, wherein said means securing said end sections to said peripheral member comprises portions of said end sections formed to partially encircle and clamp said peripheral member.

4. A grill as defined in claim 1, said electrical terminal means comprising a pair of male terminals mounted in a parallel spaced apart relationship on and to extend from one side of said peripheral member to receive an electrical female plug.

5. A grill as defined in claim 1, and handle means secured to opposite sides of said peripheral member for transporting said grill.

6. A food supporting grill for a portable cooking unit, said grill comprising a food supporting member defining a series arrangement of integrally inter-connected alternating metal food support sections and metal end sections with said food support sections positioned in a spaced apart relationship, a porcelain coated peripheral member, said end sections being formed to extend substantially about said peripheral member to secure said end sections to said peripheral member in a spaced apart relationship to each other, and electrical terminals connected within said series arrangement for the connection of electrical power thereto.

7. A grill as defined in claim 6, and a porcelain coated brace member integrally connected to opposite sides of said peripheral member and substantially perpendicular to and immediately below said food support sections.

8. A grill as defined in claim 7, wherein said food support sections have substantially an inverted U-shape in cross section.

9. A portable cooking unit comprising a bowl supported above the ground, said bowl being adapted to carry a cooking fire, an open wire grill, said open wire grill comprising a plurality of electrically and thermally uninsulated wire-like metal food supporting members carried in a spaced apart relationship to each other and a peripheral member electrically insulated from and carrying said food supporting members, a pair of male electrical terminals fixedly mounted on said peripheral member and electrically connecting said food supporting members to said pair of male electrical terminals, support means manually removeably supporting said grill in said bowl above said cooking fire, said support means being formed and arranged to cooperate with said peripheral member to manually removeably support said grill in an electrically insulated relationship from said bowl, said food supporting members having a predetermined electrical resistance to burn any food residues therefrom responsive to the connection of electrical power to said food supporting members, and a female plug assembly manually connectable to said male electrical terminals for applying electrical power thereto.

10. A portable cooking unit as defined in claim 9, and handles mounted on said peripheral member for manually removing and placing said grill as a unit from and in said bowl.

* * * * *